June 16, 1953 C. EISLER 2,641,870
CONTINUOUS TUBE CRACK-OFF MACHINE
Filed Dec. 6, 1950 3 Sheets-Sheet 1

INVENTOR.
CHARLES EISLER
BY
Harry Sommers
ATTORNEY

June 16, 1953  C. EISLER  2,641,870
CONTINUOUS TUBE CRACK-OFF MACHINE
Filed Dec. 6, 1950  3 Sheets-Sheet 2

INVENTOR.
CHARLES EISLER
BY
ATTORNEY

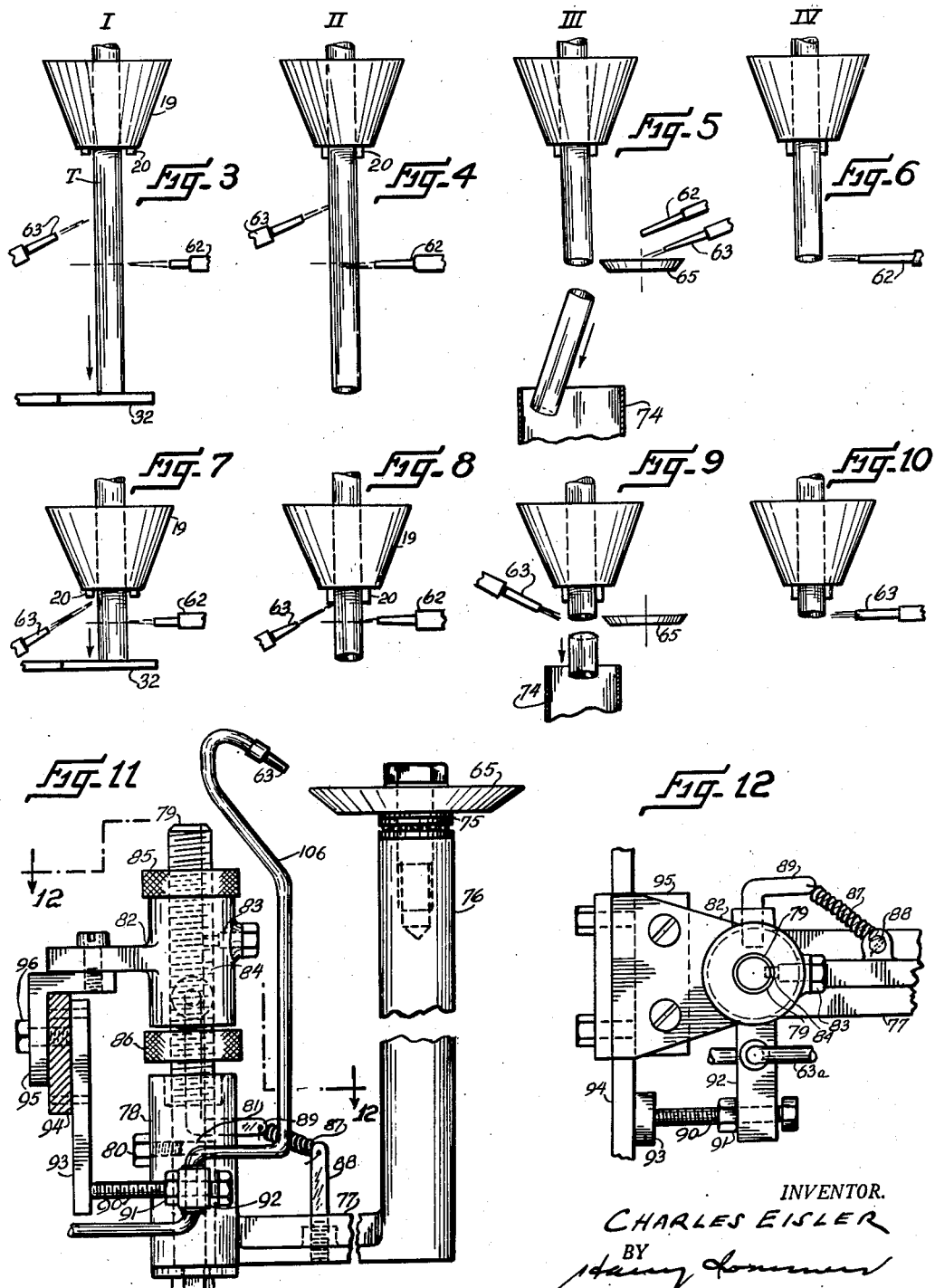

Patented June 16, 1953

2,641,870

UNITED STATES PATENT OFFICE 2,641,870

CONTINUOUS TUBE CRACK-OFF MACHINE

Charles Eisler, South Orange, N. J.

Application December 6, 1950, Serial No. 199,380

2 Claims. (Cl. 49—50)

This invention relates to the art of cracking off tubes. In the accompanying drawings and description below, the machine and method of the present invention are described, providing a continuous crack-off operation including the automatic repetition of the process during each revolution of the machine.

The invention provides for continuous automatic cracking off of glass tubing to desired predetermined lengths without the necessity of stopping the operation for indexing or similar purposes.

The invention provides for the utilization or combination of cooling jets and burners in an arrangement whereby the glass tube to be cracked off and the crack-off tool are brought to the temperature required for an ideal crack-off operation.

Figs. 3-6 inclusive are elevational schematic views illustrating successive steps in the cracking-off process, said figures containing Roman numerals denoting the position of the parts in stations correspondingly marked in Fig. 1, Figs. 7-10 inclusive are elevational schematic views illustrating the application of the process for cracking off very short lengths of tubing, Fig. 11 is a side elevational view of a form of crack-off tool embodying the invention, having height adjustment means, Fig. 12 is a fragmentary top plan view thereof, taken on line 12—12 of Fig. 11, and Figs. 13-15 inclusive are schematic elevational views of crack-off tools which may be used in carrying out the invention, shown in the crack-off operational engagement with tubes.

The drawings illustrate a practical embodiment of the invention in a machine (Figs. 1 and 2) having continuously rotating spider and glass tube chucks and parts adapted for use in connection therewith; it will be apparent, from the present description, that the invention may be used in connection with machines having other forms of continuously rotating spiders and chucks, within the scope of the invention as defined in the appended claims.

Figure 2:
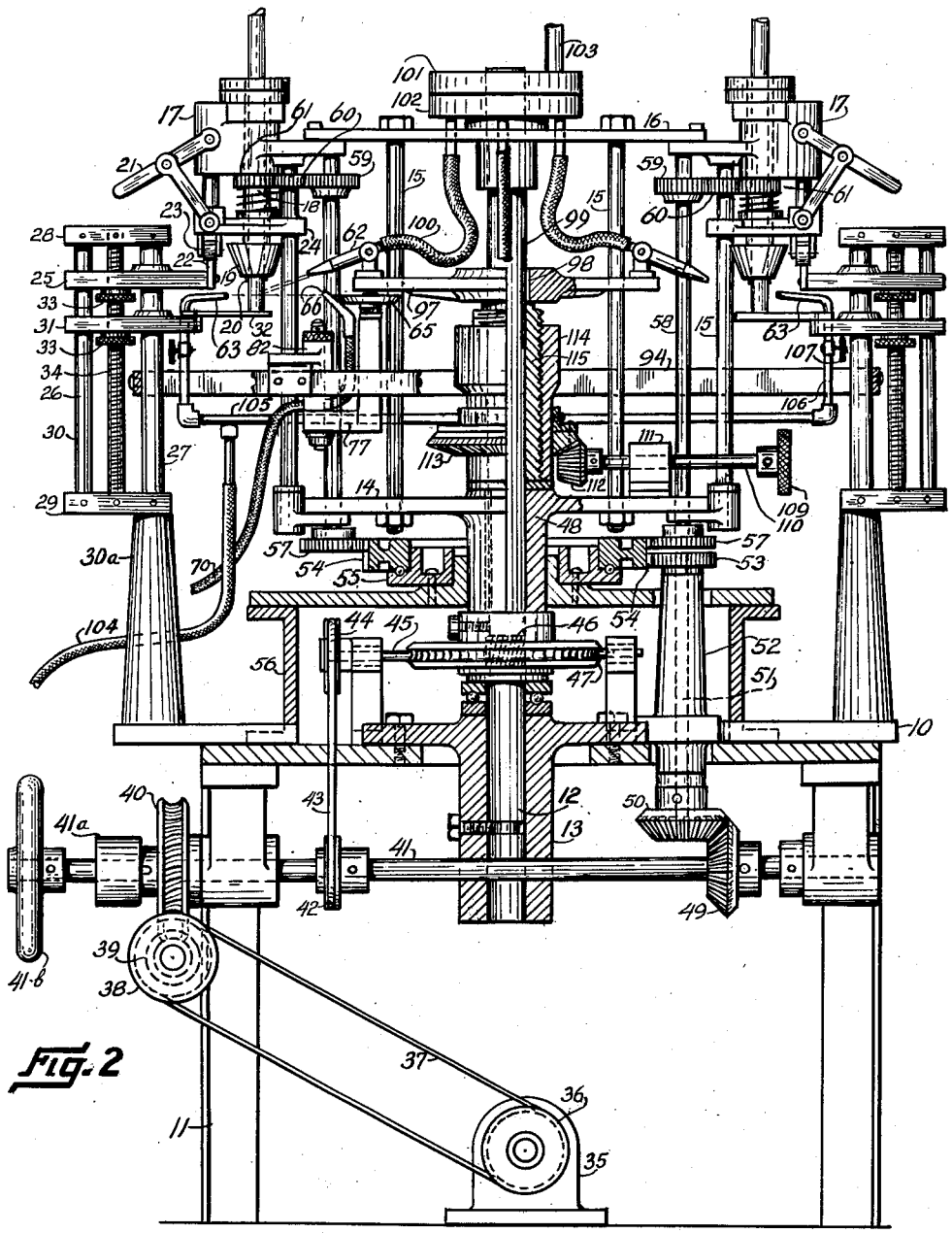
Fig. 2 is an elevational, partly sectional, view thereof.

As shown in the drawings, the machine comprises a table 10, having legs 11, the table having mounted thereon the bearing 13 for the main vertical shaft 12, to which lower spider 14 is keyed or otherwise secured. The spider 14 carries the stanchions 15 supporting upper spider 16 on which are mounted chucks 17, each chuck including sleeve 18, cone 19 and jaws 20 (Fig. 2). The chucks 17 may be of any of the convenient forms of construction well known to those skilled in the art to which the invention relates. The jaws 20 may be closed by hand lever 21 when not rotating, and automatically when in rotation in operation by engagement of the lift-roller 23 carried by the chuck opening bracket 24 with the lift-cam rail 22.

The lift cam rail 22 is mounted on bracket 25 slidable on uprights 26 and 27 connecting upper and lower plates 28 and 29 of frame 30, which is mounted on support 30a secured to table 10. The slidable bracket 31, with swivel stop plate 32 extending under the chucks, serves as a stop for the glass tubing to predetermine the length of crack-off required. Stop plate 32 may be pivotally secured to the bracket 31 for movement into and out of the position shown in Fig. 2 in any suitable or convenient manner. For example, the construction in my prior Patent No. 1,828,493, October 20, 1931, may be employed. In said patent, one plate member 32 is shown secured to another member 33 by means of a spring 31 with suitable stops 35 and 36 to prevent excessive movement in either direction. The bracket 32 may be secured to the member 33 by a suitable arrangement so that it will be yieldable against the tension of a spring in one direction and will be prevented from excessive rotation by stop members which correspond with the stops 35 and 36 of Patent No. 1,828,493, just referred to. This arrangement would prevent a wedging of the parts or the breaking of the tube if it should move past the stop plate 32, or should contact the same circumferentially instead of at the very end thereof. In such case, the bracket 32 would yield in the same manner as the member 32 of applicant's prior Patent No. 1,828,493 and would yield responsive to the force exerted thereon. Brackets 25 and 31 are each adjustable as to height by nuts 33 on vertical screw rod 34. Spider 14 is rotated continuously by motor 35 and belt and pulley transmission 36, 37, 38, driving worm 39 in mesh with worm gear 40 on drive shaft 41. On shaft 41 is mounted pulley 42 connected by belt 43 to pulley 44 on countershaft 45. On shaft 45 is keyed worm 46 engaging worm gear 47 mounted on shaft 12 and serving as a support for hub 48 of the lower spider 14.

The chucks which hold the glass tubing are rotated by means of bevel gear 49 on shaft 41 in mesh with bevel gear 50 on vertical shaft 51 journalled in the upright support 52. On shaft 51 is mounted spur pinion 53 engaging spur gear 54, which runs on anti-friction means such as thrust ball bearings in gear seat 55 mounted on support 56. Gear 54 engages gears 57 on vertical shafts 58 which carry the upper gears 59 connected by pinions 60 to gears 61 on sleeves 16 of chucks 17. Thus, as soon as the spider is set in motion, the chucks commence to rotate. The above or other driving mechanism can be disconnected from the motor 35 by hand clutch 41a on shaft 41. For trial and adjustment, the spiders and clutches can be turned by hand wheel 41b.

The cracking-off process, below described, is illustrated in Figs. 3–10 inclusive.

The stock tubing T inserted into the chuck 17 is held by the closed jaws 20. As the spider revolves, the jaws are opened at position I by cam 22 and the tubing is allowed to slide down until stopped by plate 32, at which time a pilot light, such as pilot 66, ignites burner 62 which heats the tubing at the point where it is to be cracked off, while the air jet 63 fed from air ducts 106 of air manifold 105 may be used to prevent the tubing from being overheated above that point (Fig. 3). At position II (Fig. 4), this process is continued. At position III (which is the crack-off position—Fig. 5), the heated tubing comes in contact with the crack-off tool—a bevelled disc 65 of heat-resisting material, the rim of which, by reason of its lower temperature, causes the tube to crack off, the burner 62 being for the moment extinguished by automatic valves while air jet 63 plays on the rim of the disc 65 to insure lowest temperatures. At position IV (Fig. 6), the lower part of the remaining tube end is annealed to eliminate internal stresses, and to smooth the rim.

Figs. 7–10 inclusive illustrate the crack-off process for cracking off tubes of inconsiderable length —for example, of less than one-half inch. In such cases, there is substantial risk of overheating the end which is to be cracked off. Careful adjustment of the cooling jets is necessary. The cooling jets 63 may therefore be operated continuously whereas (Figs. 3–6), for long crack-offs, they may be intermittently non-active. This is largely a matter determined in operation, according to the tubing involved.

Figure 13:
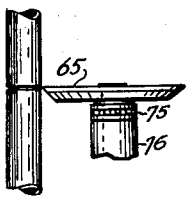
Figure 14:
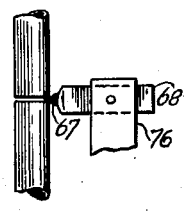
Figure 15:
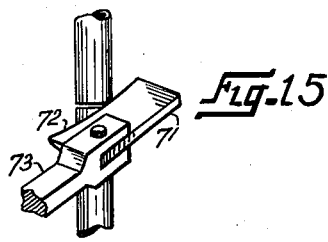

The disc tool indicated at 65 in Figs. 5 and 13 has been found to be highly satisfactory; other tools for the same purpose are shown in Figs. 14 and 15. Figs. 11 and 12 illustrate the bracket mounting device for the cracked-off tool 65. In Figs. 11 and 13, the crack-off tool is shown to comprise bevelled disc 65 freely mounted on antifriction bearings 75 on support 76. When the rotating glass tube bears up against the rim of the disc, the friction causes the disc to revolve so that the entire periphery of the glass tube is touched by the comparatively cold disc. By reason of its free bearing on its mounting, the disc therefore does not have any abrasive or scoring effect and cracking is caused solely by the sudden cooling of the glass.

The crack-off tool shown in Fig. 14 may be substituted for that shown in Fig. 13 and comprises the diamond 67 set in holder 68 and rigidly mounted in support 76. In this case, again the cracking off is aided by the difference in temperature, although, by reason of the holder's fixed position, the diamond may have a slight scoring effect on the heated glass tube. In Fig. 15, the crack-off tool consists of a blade 71 having the slightly concave edge 72 and secured to holder 73 which may, in turn, be fixed to support 76 or the like. As the blade is not rotatable, it may have a slight scoring effect on the rotating tube; cracking off is again accomplished with a difference in temperature. Annealing and some slight glazing of the crack-off rim of the retained tubing may be effected at position IV (Fig. 6). This additional heating has the effect of freeing the glass from internal stresses. With some kinds of tubing, especially the thin-walled and small diameter type, this operation may be omitted. The cracked part of the tubing drops immediately into chute 74 (Fig. 5).

The complete disc crack-off tool shown in Figs. 11 and 12 comprises disc 65 on ball bearings 75 journalled in support 76 which is integrally connected by bracket 77 with sleeve part 78, the latter being freely rotatable on shaft 79. The sleeve 78 is kept vertically in place by screw 80 engaging circular groove 81 in shaft 79. The upper half of shaft 79 is threaded and is slidable in main bracket 82, rotation of shaft 79 being prevented by screw pin 83 engaging slot 84 of shaft 79. Vertical adjustment of the position of crack-off disc 65 is effected by raising or lowering shaft 79 by means of nuts 85 and 86. When making contact with the glass tube, the disc 65 swings resiliently responsive to coil spring 87 connected to pin 88 of swinging bracket 77 and pin 89 in the fixed main bracket 82, the back swing of disc 65 being limited by adjustable screw 90 having jam nut 91, which is threaded in arm 92 of sleeve 78. The screw 90 bears against the stop member 93 secured to circular rail 94 to which main bracket 82 is secured by angle plate 95 and bolts or screws 96, circular rail 94 being carried by uprights 27 of frames 30 (Fig. 2). The disc air-cooling nozzle 63 and its duct 106 (Fig. 11) are mounted in arm 92 of sleeve 78, so that, during the swing of the disc, the nozzle 63 will remain in correct relation thereto.

The burners 62 for heating the glass tubes are carried by the burner-spider 97 which is co-rotatable with and slidable on shaft 12 by means of key and keyway 98 and 99. Gas and oxygen are fed to the burners by ducts 100 through the usual rotary valve 101—102 and mixer tube 103. The burners thus continuously follow the chuck with the glass tubes, the only stationary device being the cracking-off device and associated parts of bracket 25.

Air for cooling is supplied from an outside air compressor (not shown) through tube 104 to the circular air manifold 105 having branch ducts 106 to nozzle 63—each duct being provided with a valve 107 whereby the air flow can be regulated or shut off as desired.

The burners are lit as they pass the pilot flame 66 to which gas is fed (from an outside source) by the duct 70.

Although, in the drawing, the nozzles 63 are shown fed from the circular air manifold, the invention is not limited to such arrangement. The nozzles may be carried, like the burners, on the burner-spider 97 so that the burners and air nozzles may be adjusted vertically an equal amount—by raising and lowering the spider 97, which can be effected by turning the hand knob 109 on shaft 110 in bearing 111 on spider 14. This will turn the bevel pinion 112 and gear 113 mounted on sleeve 114, which is threaded on inner sleeve 115 slidable on shaft 12 and resting on the hub of spider 97. By turning the sleeve 115 which abuts the burner spider 19 up or down, the spider is accordingly raised or lowered. The device described is one of several means which may be used for height adjustment of the burners.

Figure 1:
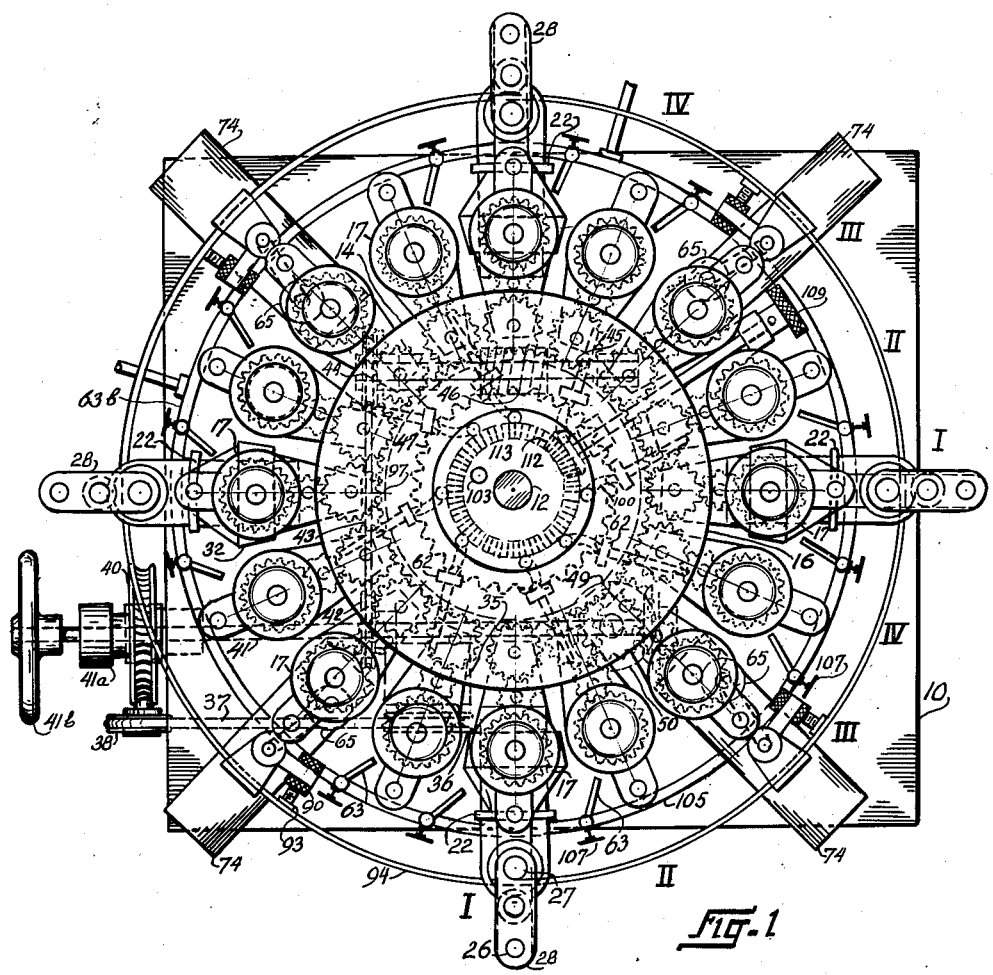
Fig. 1 is a top plan view of a machine embodying the invention.

In Fig. 1, the machine is shown as provided with sixteen chucks—every four positions yielding one crack-off (Figs. 1, 3–6)—or a total of four crack-offs for every revolution of the spider. By combining some of the operations or dispensing therewith, a lesser number of chuck positions would be required for completion of each crack-off operation.

Having thus described my invention, what I claim as new and desire to secure by Letters Patent is:

1. In an apparatus for cracking glassware, a bracket adapted to be mounted upon a carrier and having a vertical bore, a threaded shaft extending vertically through the bore of said bracket and being freely slidable vertically therein and having a vertical groove, a pin carried by said bracket and engaged in said groove and preventing rotation of the shaft in the bracket, nuts upon said shaft above and below said bracket serving to shift the shaft vertically and said nuts being engageable with the upper and lower ends of the bracket to grip the bracket therebetween and secure the shaft in a vertically adjusted position, a support carried by said shaft, a post carried by said support and extending upwardly in laterally spaced relation to the support and the bracket, a crack-off member carried by said post, and a pipe carried by said support and provided with a nozzle directed towards the crack-off member.

2. The structure of claim 1, wherein the support consists of a sleeve rotatably fitting about the threaded shaft, the post being supported from the sleeve by an arm extending between the sleeve and the post, there being a groove formed about the shaft within the sleeve, a screw carried by said sleeve and engaged in the groove and preventing movement of the sleeve vertically on the shaft, a spring urging the rotation of the sleeve about the shaft in one direction, an arm extending from said sleeve and carrying the tube, and an adjustable member for limiting the rotation of the sleeve in an opposite direction carried by said arm.

CHARLES EISLER.

References Cited in the file of this patent

UNITED STATES PATENTS

| Number | Name | Date |
|---|---|---|
| 684,686 | Grotz | Oct. 15, 1901 |
| 894,019 | La Clare | July 21, 1908 |
| 1,546,352 | Rippl | July 14, 1925 |
| 2,169,455 | Wagner, Sr. | Aug. 15, 1939 |
| 2,297,149 | Houck et al. | Sept. 29, 1942 |
| 2,410,931 | Eisler | Nov. 12, 1946 |

FOREIGN PATENTS

| Number | Country | Date |
|---|---|---|
| 92,761 | Germany | July 12, 1897 |
| 288,197 | Germany | Oct. 23, 1915 |